United States Patent [19]

Yergen

[11] 4,247,134
[45] Jan. 27, 1981

[54] SEALING MEANS SEALING INTERCONNECTED FITTING ASSEMBLIES

[76] Inventor: Robert F. Yergen, 20355 Wilson River Hwy., Tillamook, Oreg. 97141

[21] Appl. No.: 33,140

[22] Filed: Apr. 25, 1979

[51] Int. Cl.³ .............................................. F16L 35/00
[52] U.S. Cl. ...................................... 285/38; 251/144; 251/155; 285/158; 285/193; 285/201; 285/184
[58] Field of Search ............... 285/193, 196, 161, 162, 285/159, 220, 201, 202, 205, 38, 184; 251/144, 155; 220/303; 222/568

[56] References Cited

U.S. PATENT DOCUMENTS

| | | | |
|---|---|---|---|
| 81,305 | 8/1868 | Smith | 285/201 |
| 213,667 | 3/1879 | Kronenberg et al. | 285/201 |
| 274,361 | 3/1883 | Newcomb | 285/201 X |
| 1,159,685 | 11/1915 | Killefer et al. | 285/143 X |
| 2,733,937 | 2/1956 | Mowrer | 285/34 |
| 2,793,912 | 5/1957 | Krohm | 285/281 X |

*Primary Examiner*—Dave W. Arola
*Attorney, Agent, or Firm*—Kolisch, Hartwell & Dickinson

[57] ABSTRACT

Sealing means sealing interconnected fitting assemblies. A faucet assembly with an externally threaded stem is mounted on a bunghole assembly with an internally threaded bore by turning the stem of the faucet assembly into the bore of the bunghole assembly. A winged nut is carried on the stem of the faucet assembly. It is advanced on the stem to compress a gasket or washer interposed between the nut and the bunghole assembly. A fluid-tight connection may be established after desired orientation of the faucet assembly with respect to the bunghole assembly.

2 Claims, 4 Drawing Figures

SEALING MEANS SEALING INTERCONNECTED FITTING ASSEMBLIES

BACKGROUND AND SUMMARY OF THE INVENTION

This invention relates to means for producing a fluid-tight seal between two interconnected fitting assemblies.

Various liquid products, for example oil products and the like, are often shipped and stored in containers such as drums. The liquid product is introduced and withdrawn from the drum through a bunghole located in an end wall of the drum, ordinarily adjacent a cylindrical side wall in the drum. During storage and shipment, this bunghole is closed by a removable cap. To prepare the drum for the dispensing of material therefrom, the cap is removed and a faucet assembly including a threaded stem is mounted on the drum with the stem screwed into an internally threaded bore which is part of the bunghole. The drum may then be laid on its side with the bunghole located at the lowermost position permitted through positioning of the drum. Liquid product may then be dispensed through opening of the faucet in the faucet assembly with the liquid product flowing under gravity out through the faucet.

The usual stem in such a faucet assembly is provided with tapered external threads which facilitate screwing of the faucet assembly into place. A fluid-tight mounting of the faucet assembly is achieved when the assembly is turned to advance as far as conveniently possible the tapered threads of the stem into the non-tapered threads of the bunghole. This condition may be achieved with the faucet in the assembly having any number of orientations with respect to the side portion of the drum closest to the bunghole, i.e., it may be facing the side portion (which would be optimum in the gravity dispensing system earlier described) or it may be facing exactly the opposite direction (which obviously introduces problems in such a gravity dispensing system).

According to this invention, an internally threaded hand manipulatable nut element is provided which is turned or screwed onto the stem portion of the faucet assembly before mounting of the faucet assembly in the bunghole. Preferably, the nut element is provided with non-tapered internal threads and these are of a sufficient diameter to enable the nut element to be advanced over the entire length of the threads in the stem portion. A gasket or washer is also provided over the face of the nut element which faces outwardly on the stem portion. With the nut element and gasket mounted on the stem portion, the faucet assembly is screwed into the threaded bunghole and turning is continued until the faucet assembly is fairly snugly carried by the bunghole but not necessarily until a fluid-tight connection is established. Turning is stopped with the faucet in the assembly having the desired orientation with respect to the drum. The nut element earlier described may then be advanced along the stem portion toward the bunghole so as to compress the gasket between the nut element and the bunghole and produce a fluid-tight connection.

A general object of the invention therefor is to provide a novel construction for the sealing of two interconnected fitting assemblies without the requirement that one be turned to a tightened condition with respect to the other.

Another object is to provide such a construction which features a hand manipulatable nut or nut element which is turned onto the threaded stem portion of one of the fitting assemblies before interconnection of the fitting assemblies and which after interconnection of the fitting assemblies is advanced along the stem portion to produce a fluid-tight seal. In this connection, it is contemplated that a gasket or washer be provided which is the production of a fluid-tight seal.

In many drum constructions, the bunghole comprises what might be thought of as a bunghole fitting held in place on the end wall of a drum by a collar which bears against an annular flange in the fitting. Leakage problems sometimes have been experienced by reason of liquid flowing into the bunghole by seeping between the collar described and the flange of the fitting. In the construction contemplated by this invention, this leakage is effectively taken care of.

DETAILED DESCRIPTION OF A PREFERRED EMBODIMENT

Figure 1:
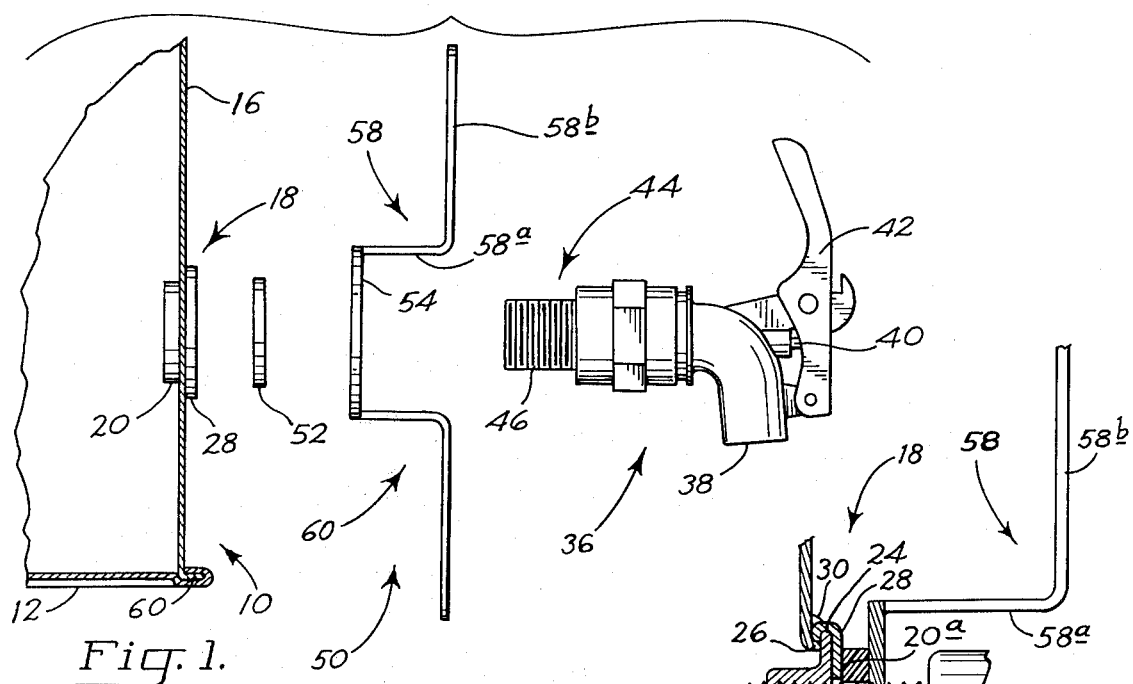
FIG. 1 is an exploded view of one embodiment of the invention.
Figure 2:
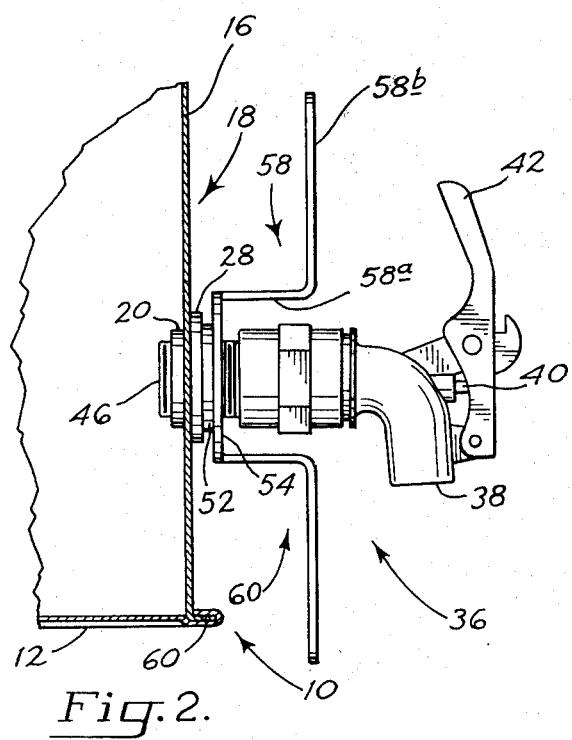
FIG. 2 illustrates the elements illustrated in FIG. 1 in an assembled state.
Figure 3:
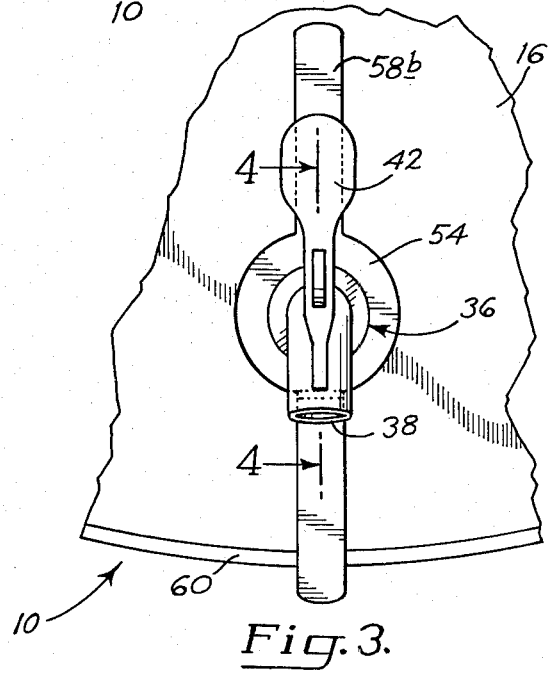
FIG. 3 is a front view of the apparatus illustrated in FIG. 2.

Turning now to the drawings, indicated generally at 10 are portions of a container or drum such as is typically used in the packaging of materials such as petroleum products. The drum includes a cylindrical side wall 12 and a bulkhead or end wall such as the one shown at 16 closing off each of the opposite ends of the drum. A bunghole assembly is shown at 18 also referred to herein as a fitting assembly or fluid conduit unit. Only portions of the drum are shown in FIGS. 1 and 2, but it should be understood that the axis of the drum is well above the illustrated portions shown. With the drum position as illustrated, the bunghole assembly is positioned as close as possible to the ground or other means upon which the drum rests.

Figure 4:
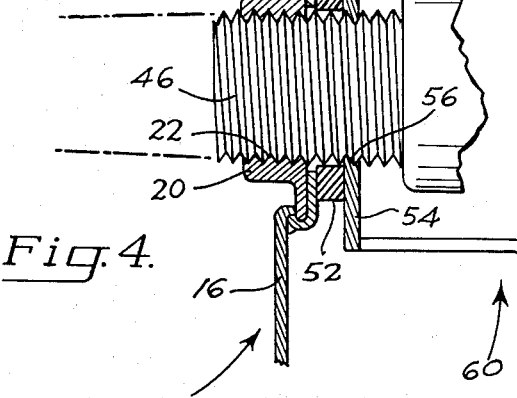
FIG. 4 is a cross-sectional view taken along the line 4—4 in FIG. 3 on a slightly enlarged scale.

Considering details of the construction of the bunghole assembly and referring particularly to FIG. 4, shown at 20 is what as referred to herein as a bunghole fitting. An internally threaded bore 22 extends axially through the body of the fitting. An annular flange 24 extending about the fitting rests against shoulder 26 formed in the bulkhead of the drum. Collar 28 holds the flange 24 against shoulder 26 and such may be welded in place as at 30. Space 20a of the collar constitutes a compression face in the assembly.

A faucet assembly is shown at 36 which constitutes a second fitting assembly or fluid conduit unit in the construction. Describing details of the faucet assembly, such includes a faucet mouth 38, a valve actuator 40 for actuating valve mechanism in the assembly (not shown) and pivoted handle structure 42 for actuating the valve actuator. One end of the assembly takes the form of a stem portion 44. The stem portion as is typical of such faucet assemblies has tapered external threads 46 extending therealong (best illustrated in FIG. 4 where the dot-dash line extensions of the thread outlines converge on each other).

Internal threads 22 of the bunghole fitting typically are non-tapered. The tapered threads in the faucet assembly are provided to facilitate initial insertion of the faucet stem portion into the bunghole fitting. According to conventional practice, the faucet assembly would be screwed into the bunghole fitting until a tightened condition was reached by reason of the tapered threads in the faucet assembly. Such tightened condition was reached with the faucet assembly oriented in no particular position relative to the base of the drum, i.e., such could be facing downwardly, upwardly or to one side. The tightened condition would inhibit leakage through the internally threaded bore of the bunghole fitting but no provision is made inhibiting leakage around flange 24 in the fitting and between the flange and the collar 28.

To provide a seal without having firmly to tighten the faucet assembly within the bunghole assembly, a wing nut means 50 and a compressable washer or gasket 52 are provided.

Wing nut means 50 includes a nut portion 54 having a non-tapered internally threaded bore 56 disposed centrally of the nut portion. The internal threads of the bore are of a diameter sufficient to receive the external threads of largest diameter in the stem portion of the faucet assembly. Extending out from diametrically opposite sides of the nut portion are opposed wings 58, 60. As exemplified by wing 58, each wing includes a wing portion 58a joined to the nut extending at an angle from the plane of the nut and another wing portion 58b joined to the outer extremity of the first-mentioned wing portion and substantially paralleling the plane of nut portion 54.

The washer or gasket 52 has an internal bore of sufficient size to enable it to pass over the entire expanse of the threaded stem portion in the faucet assembly. The washer or gasket may be a separate piece as illustrated in FIG. 1 or for convenience purposes may be secured to the wing nut means to form a unified assembly of the wing nut means and the washer.

In utilizing the apparatus that has been described, prior to mounting the faucet assembly to the bunghole assembly, the wing nut means is screwed onto the threaded stem portion in the faucet assembly and advanced inwardly on this stem portion usually the entire length of the expanse of threads in the stem portion. The washer is placed about the stem portion against the wing nut means which prepares the faucet assembly for mounting on the bunghole assembly.

The stem portion of the faucet assembly is then placed within the internally threaded bore of the bunghole assembly and the faucet assembly turned to produce a snug but not necessarily a fluid-tight fit of the stem portion within the threads of the bunghole fitting. Turning of the faucet assembly is stopped when such has the desired orientation with respect to the drum on which the assembly is mounted, which would be in an orientation facing downwardly in the particular organization described. To produce a fluid-tight seal, the wing nut means is turned to advance it along the threaded stem toward the end of the stem. Tightening of the wing nut means causes the gasket or washer to be compressed between the outer face of collar 28 and a side of the nut portion 54. Furthermore, an axial force is exerted on the stem portion tending to cause such to be axially displaced within the bung hole fitting wherein the threads of the respective elements tend to be jammed against each other. With the faucet assembly properly mounted as perhaps best illustrated in FIG. 4, leakage is inhibited through the bore of the bunghole fitting. Additionally, leakage is inhibited around flange 24 and between this flange and collar 28.

It is preferable that the wing nut means have wing portions 58b offset from the plane of nut portion 54 as this enables the wing portions to have sufficient length whereby proper leverage may be exerted thereon by hand manipulation, otherwise turning of the wing nut means is prevented by the usual ridge that is found in a drum where the side and end wall of the drum join such as shown at 60.

With the system described, there is no longer the requirement that wrenches and other tools be used in tightening the faucet assembly in place. Inadvertent damage to a faucet assembly or to a bunghole assembly caused by excessive turning torque being applied to a faucet assembly tends to be minimized. The wing nut means is an easily handled tool and can be left in place on the faucet assembly as the faucet assembly is used with successive drums.

Other modifications of the invention would be apparent to one skilled in the art.

It is claimed and desired to secure by letters patent:

1. In combination with a drum which includes a cylindrical sidewall and end walls closing off the ends of the drum, one of said end walls including a bunghole assembly providing access to the interior of the drum which includes an internally threaded, non-tapered, annular fitting and an annular collar concentric with the fitting, said collar overlying outer portions of the fitting and being secured to said end wall and securing the fitting in place,
   a faucet assembly including a tapered externally threaded stem with threads of largest diameter located inwardly from the free end of the stem, mounted with its threaded stem screwed into the internal threads of the fitting,
   a gasket surrounding said stem and bearing against said collar, and
   a hand-manipulatable nut having non-tapered internal threads of a diameter sufficient to receive the external threads of largest diameter in the stem, said nut being mounted on said stem and compressing said gasket against said collar with the gasket being effective to inhibit leakage past the threads of said stem and leakage between the fitting and collar,
   said stem being tapered from the free end of the stem inwardly on the stem beyond the region where the nut is located, the threads of the nut in reaction to the compression of the gasket jamming against the threads of the stem to inhibit leakage, the faucet assembly being mountable on the fitting through turning of the faucet assembly to advance the stem into the fitting and turning being stopped on the faucet assembly having desired orientation relative to the drum.

2. The combination of claim 8, wherein said one end wall and sidewall of the drum join in a flange which projects axially from the end of the drum, and said hand-manipulatable nut has wing portions projecting radially therefrom, which are laterally offset from said nut in a direction extending away from said end wall so as to be spaced outwardly from the edge of said flange.

* * * * *